United States Patent [19]

Tayaoka et al.

[11] Patent Number: 5,278,917
[45] Date of Patent: Jan. 11, 1994

[54] LATHE CUTTING SIMULATION METHOD

[75] Inventors: Eriko Tayaoka; Yoshinori Tsujido, both of Amagasaki, Japan

[73] Assignee: Mitsubishi Denki Kabushiki Kaisha, Tokyo, Japan

[21] Appl. No.: 698,983

[22] Filed: May 13, 1991

[30] Foreign Application Priority Data

May 14, 1990 [JP] Japan .................. 2-125146
Nov. 28, 1990 [JP] Japan .................. 2-335421

[51] Int. Cl.$^5$ .......................... G06F 15/46
[52] U.S. Cl. .................. 382/8; 364/474.26; 364/474.16; 358/101
[58] Field of Search .......... 364/559, 560, 474.26, 364/474.20, 474.02, 474.16; 382/8, 1; 340/729; 395/120, 126; 358/101; 128/653.2

[56] References Cited

U.S. PATENT DOCUMENTS

| | | | |
|---|---|---|---|
| 4,709,231 | 11/1987 | Sakaibara ............ | 395/126 |
| 4,734,845 | 3/1988 | Kawamura et al. ......... | 364/474.26 |
| 4,788,481 | 11/1988 | Niwa .................. | 364/474.26 |
| 4,866,637 | 9/1989 | Gonzalez-Lopez ........ | 395/126 |
| 4,868,761 | 9/1989 | Hayashi ............... | 364/474.26 |
| 4,943,938 | 7/1990 | Aoshima et al. ........ | 340/729 |
| 4,972,323 | 11/1990 | Cauwet ................ | 364/474.26 |
| 5,060,163 | 10/1991 | Matsumura ............. | 364/474.26 |
| 5,072,399 | 12/1991 | Laws et al. ........... | 364/474.02 |
| 5,175,688 | 12/1992 | Sasaki et al. ......... | 364/474.26 |

FOREIGN PATENT DOCUMENTS

| | | |
|---|---|---|
| 3401060 | 1/1985 | Fed. Rep. of Germany . |
| 3734826 | 10/1987 | Fed. Rep. of Germany . |
| 1-92807 | 4/1989 | Japan . |
| 2-125146 | 5/1990 | Japan . |

OTHER PUBLICATIONS

Translation of German Office Action in corresponding Application No. 41 15 526.2-35.

Primary Examiner—Joseph Mancuso
Assistant Examiner—Steven P. Klocinski
Attorney, Agent, or Firm—Rothwell, Figg, Ernst & Kurz

[57] ABSTRACT

A lathe cutting simulation method comprises the steps of preparing workpiece shading drawing data from workpiece shape data, displaying the shape of the workpiece by using the drawing data, computing the positions of the workpiece and tools on the basis of the input workpiece and tools information and updating workpiece shape data, updating the drawing data on the basis of the updated shape data, and displaying the entire workpiece based upon the updated drawing data.

2 Claims, 4 Drawing Sheets

FIG. 2
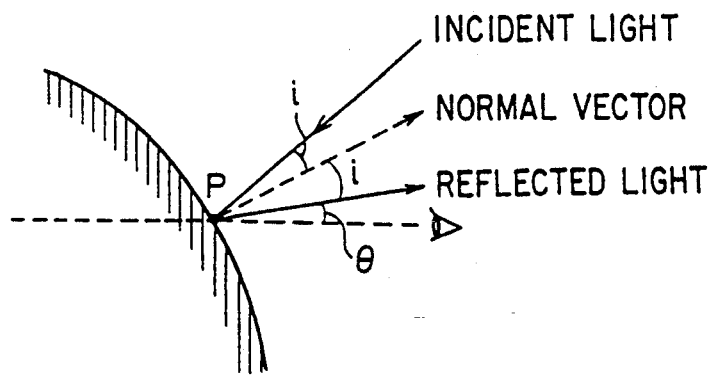
FIG. 3A   FIG. 3B
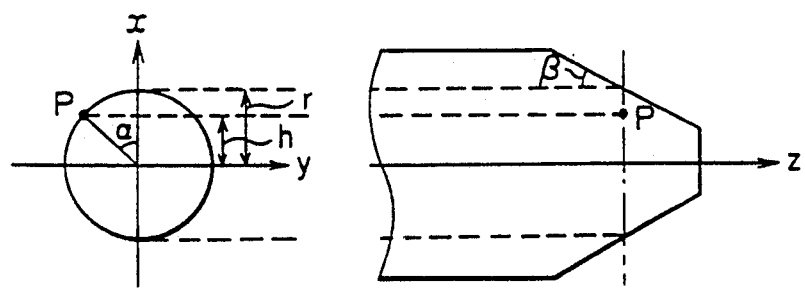
FIG. 4
| cos α \ cos β | 1.0 | 0.9 | 0.8 | 0.7 | 0.6 | ... | -1.0 |
|---|---|---|---|---|---|---|---|
| 1.0 | 162 | 77 | 93 | 103 | 113 | ... | 104 |
| 0.9 | 161 | 76 | 91 | 101 | | ... | 104 |
| 0.8 | 160 | 73 | 86 | | | | |
| 0.7 | 158 | 70 | | | | | |
| ... | ... | ... | | | | | |
| -1.0 | 104 | 63 | | | | | 162 |

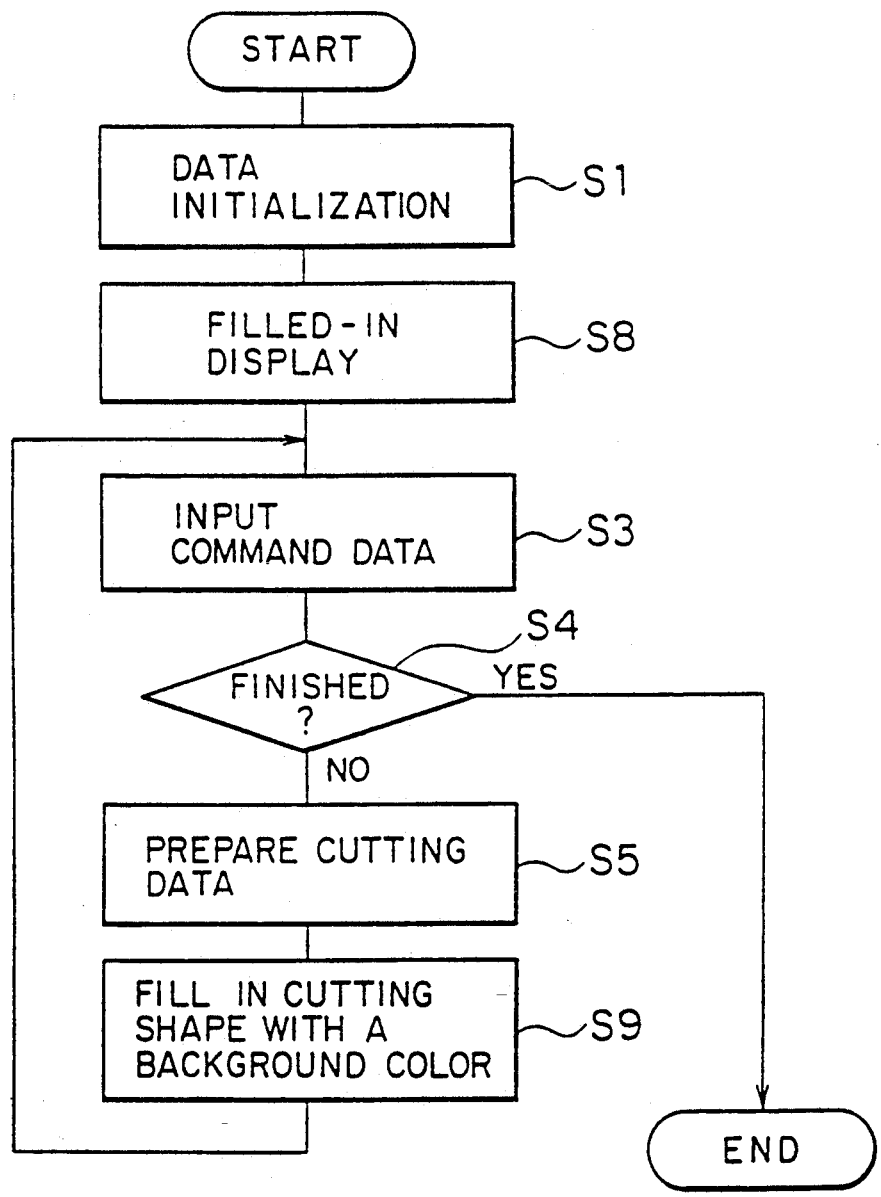

LATHE CUTTING SIMULATION METHOD

BACKGROUND OF THE INVENTION

1. Field of the Invention

The present invention relates to a method of simulating the circumstances in which a workpiece is cut by a lathe so that an operator can easily understand the cutting operation.

2. Description of the Related Art

In a conventional method of lathe cutting simulation, for example, as described in Japanese Patent Laid-Open No. 1-92807, the desired shape of a cross section of a workpiece is shown as filled in on a display. The display of the portion to be cut as a tool moves is filled in with a background color, thus displaying changes in the shape of the workpiece.

For example, in FIG. 5, a method of lathe cutting simulation is performed by a method wherein a workpiece 1 is shown as seen from a direction perpendicular to the lathe's main axis 10 and the main axis of a cutting tool (not shown). FIG. 6 shows an example of a workpiece 11 and a tool 12 in a conventional method of simulated cutting by a lathe.

The conventional method will now be explained with reference to a flowchart in FIG. 7. In step S1, shaping data of the shape of a workpiece and tools are initialized. In a subsequent step S8, the workpiece is filled in and displayed. Next, in step S3, positional data of the tools and workpiece are input. In step S4, a check is made to determine whether or not all of the positional data has been input. When the input of the data has been completed, the process ends. On the other hand, when it has not been completed, a cutting shape is prepared on the basis of the input positional data in step S5. In a subsequent step S9, the cut portion is filled in with a background color. The simulated cutting is made possible by repeating these steps S3, S4, S5, and S9 at high speed.

In such a conventional method, however, the shape of a workpiece after it has been cut must be recognized from the shape of the cross section thereof. It is sometimes difficult to recognize the shape when there is a complex machining operation. Moreover, it may be difficult for a non-experienced operator to recognize the correct shape.

SUMMARY OF THE INVENTION

The present invention has been devised to solve the above-mentioned problems. Accordingly, an object of the present invention is to provide a method of simulated cutting by a lathe in which an operator can easily recognize the desired shape of a workpiece.

To this end, according to the present invention, there is provided a method of simulated cutting by a lathe, comprising the steps of: preparing workpiece shading drawing data from workpiece shape data; displaying the shape of the workpiece by using the drawing data; computing the positions of the workpiece and tools on the basis of the input workpiece and tools information and updating workpiece shape data; updating the drawing data on the basis of the updated shape data; and displaying the entire workpiece by using the updated drawing data.

BRIEF DESCRIPTION OF THE DRAWINGS

FIGS. 2 and 3 are both conceptual views showing shading techniques used in the embodiment of the present invention;

FIG. 4 is a Table showing brightness data;

FIG. 7 is a flowchart showing the conventional simulated cutting method.

DESCRIPTION OF THE PREFERRED EMBODIMENT

Figure 1:
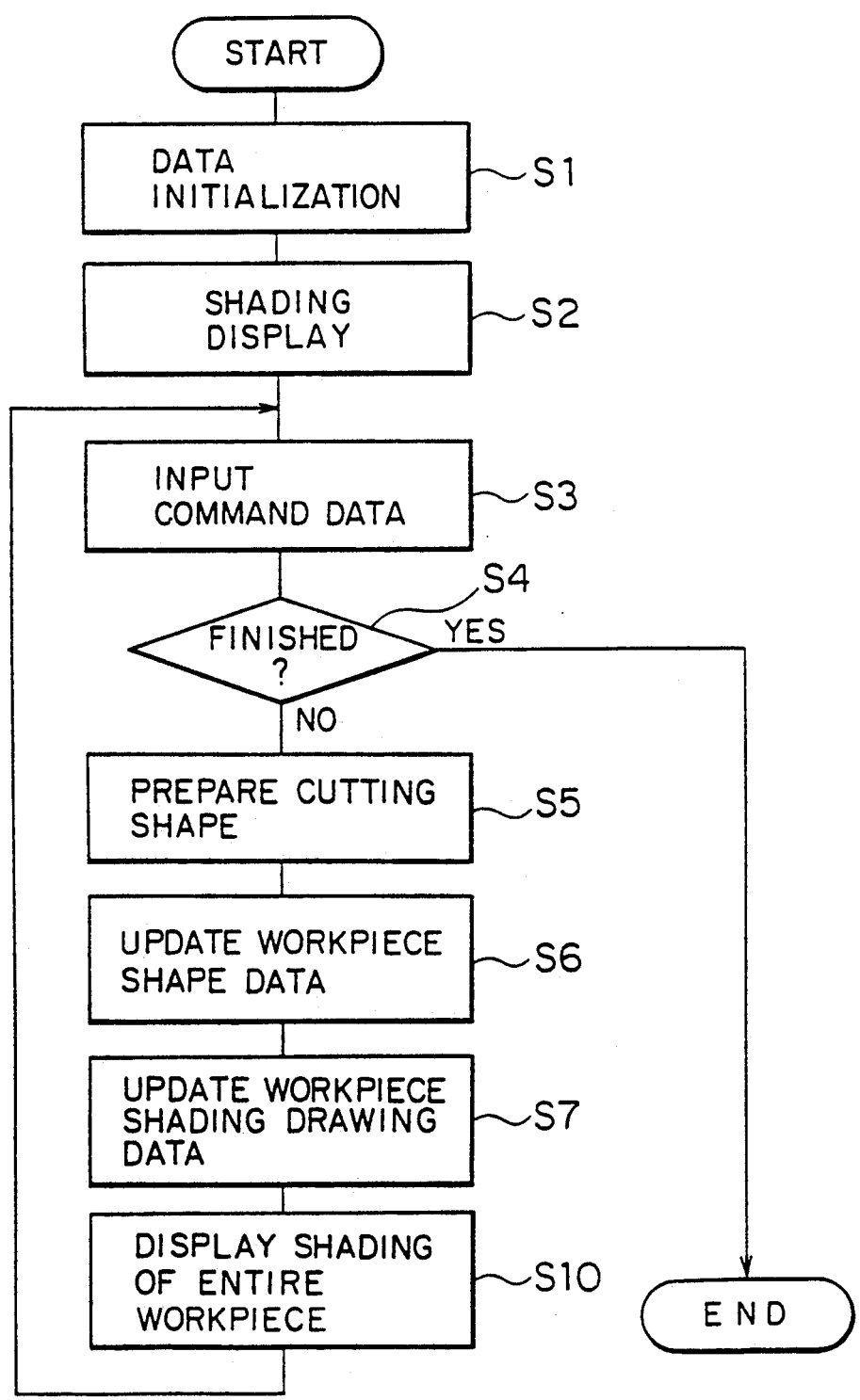
FIG. 1 is a flowchart showing a method of simulated cutting by a lathe of an embodiment of the present invention.
Figure 5:
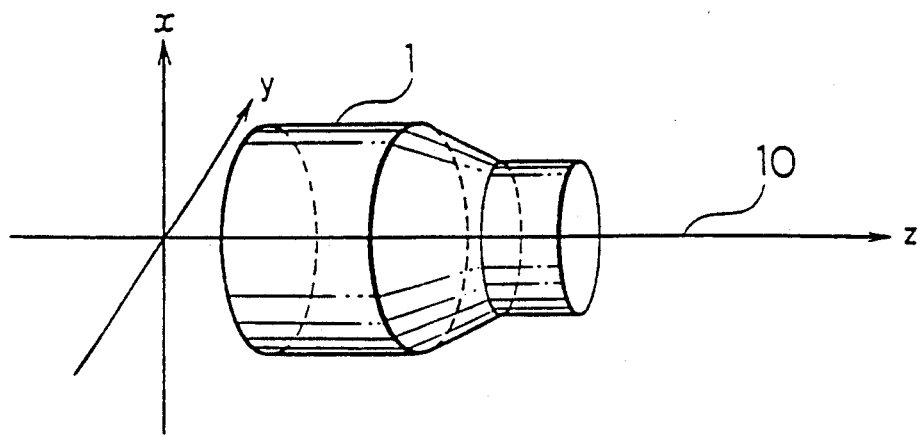
FIG. 5 is a view showing the main axis of a lathe.
Figure 6:
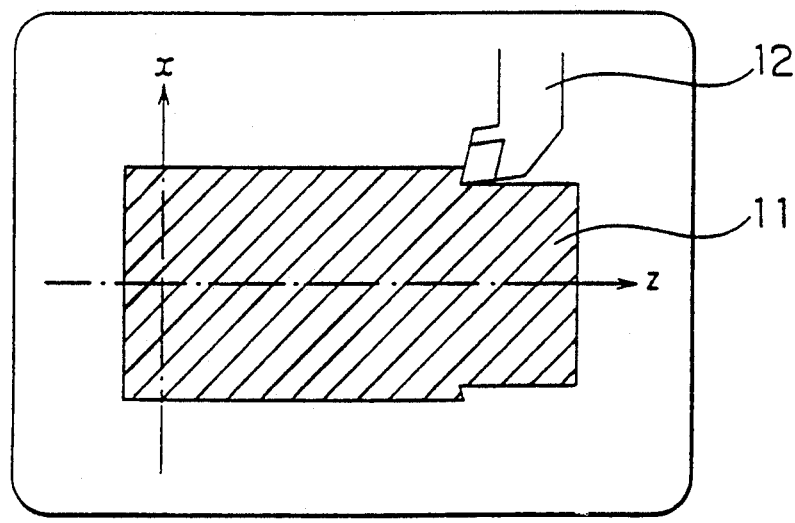
FIG. 6 is a view showing an example in which a conventional simulated cutting method is displayed.

A method of simulated cutting by a lathe of an embodiment of the present invention will be explained hereinbelow with reference to a flowchart in FIG. 1.

In step S1, data on the shapes of a workpiece and of tools are initialized. In a subsequent step S2, the shape of the workpiece is displayed by using a shading technique, and then in step S3, positional data of tools and workpiece are input.

Next, in step S4, a check is made to determine whether or not all of the positional data has been input. When the input of the data has been completed, the process ends. On the other hand, when it has not been completed, the process proceeds to step S5 where a cutting shape is prepared on the basis of the input positional data. In a subsequent step S6, the shape data of the workpiece is updated by using the cut shape prepared in step S5. In step S7, workpiece shading display data is updated based upon the shaping data of the workpiece updated in step S6. In step S10, the shading of the entire workpiece is displayed based upon the new drawing data.

The above steps S3 to S7, and S10 are repeated until it is determined in step S4 that the input of positional data has been completed.

The shading technique in steps S2, S7, and S10 will now be explained. For example, according to a reference book, "Interactive Computer Graphics" (McGraw-Hill Kogakusha, Ltd.), and as shown in FIG. 2, the energy E of reflected light which enters the eye from a point P on an object having a reflection factor R and a mirror-surface reflection factor W, as a result of incident light of energy I which impinges upon the object at point P at an incident angle i with respect to a normal vector (the normal vector bisecting the angle between the incident light ray and the reflected light ray), can be expressed by the following equation when the an angle between the reflected light and one's line of vision is denoted as $\theta$, and a component for adjusting brightness is denoted as n:

$$E = [R\cos i + W(\cos\theta)^n] \cdot I \qquad (1)$$

At this point, if it is assumed that the line of vision of the observe is a vector perpendicular to the rotation axis of the object from an infinitely distant point and an illumination light beam is a parallel light beam from an infinitely distant point and also perpendicular to the rotation axis of the object, the brightness of each point on the surface of the object can be determined from the angle of inclination of the external surface line of the object with respect to the rotation axis, and the angle of the point on the surface of the object with respect to the line of vision of the observer, which is expressed by the height of a projection of the point on the radius of the cross-section of the object in a direction perpendicular to the radius.

That is, in three dimensionsal (X, Y, Z) coordinates, if one's line of vision is denoted by (0,1,0), an illumination light beam by (a,b,0), an angle for indicating the height h of a line connecting the projection of point P on the radius r in a direction perpendicular to the radius r as $\alpha$, as shown in FIG. 3, and the angle of inclination of the external line of a cross-section shape, with respect to the rotation axis (z), as $\beta$, then the above equation (1) becomes the following:

$$E = [R\cos\beta(b\sin\alpha - a\cos\alpha) + W\{-b + 2\sin\alpha\cos^2\beta(b\sin\alpha - a\cos\alpha)\}^\eta] \cdot I \quad (2)$$

The lefthand portion of FIG. 3 shows a view of the object in the (X,Y) dimension, with the Z axis perpendicular to the page. The righthand portion of FIG. 3 shows a view of the same object in the (X,Z) dimension, with the Y axis perpendicular to the page. The line of vision to the point P is perpendicular to the Z axis.

Therefore, a brightness table concerning the inclination of the external line ($\cos\beta$) and the height with respect to the radius ($\cos\alpha$) can be prepared from this equation (2). FIG. 4 shows an example of a brightness table prepared in this manner.

The shape of the workpiece is stored as sequence-of-point data of an external line thereof by using the above-mentioned angles $\alpha$ and $\beta$. Shading drawing data of the shape of the workpiece is prepared by using the brightness table. In addition, based on the flowchart shown in FIG. 1, positional data of tools and workpiece are input according to the movement of the tools; workpiece shaping data is updated; shading drawing data of the portion where the shape of the workpiece is changed is updated; and the shading of the entire workpiece is displayed.

What is claimed is:

1. A lathe cutting simulation method, for simulating by a computer system the cutting of a workpiece on a lathe by cutting tools, comprising the steps of:

retrieving initial workpiece shape data representing the shapes of said workpiece and said tools;

computing workpiece shading image data representing a workpiece shading image from said initial workpiece shape data, rotated around an axis on said lathe, in accordance with a shading technique based on a given source of incident light on said workpiece and a given line of vision to said workpiece;

providing a brightness table located in a memory of said computer system, said brightness table storing said workpiece shading image data;

displaying said workpiece shading image on a display according to said computed workpiece shading image data stored in said brightness table;

receiving inputted positional data representing relative positions of said workpiece and said tools with respect to each other;

computing relative positions of said workpiece and said tools according to said inputted positional data, and updating said initial workpiece shape data according to said computed position;

updating, by storing in said memory, said workpiece shading image data in accordance with said shading technique and said updated initial workpiece shape data; and generating output signals for displaying an updated workpiece shading image on said display according to said updated workpiece shading image data, wherein each of said steps is performed on said computer system.

2. A lathe cutting simulation method according to claim 1, wherein said shading technique comprises the use of said brightness table, said brightness table having stored therein predetermined levels of display brightness for each of a number of identifiable points on a surface of the workpiece according to an angle of inclination of an external surface line of said surface at each point with respect to an axis of rotation of said workpiece on said lathe, and an angle which specifies a distance of each identifiable point from the axis of said lathe;

said angle of inclination and said distance specifying angle being computed for each of said points in accordance with said workpiece shape data; and said predetermined levels of display brightness being read from said brightness table according to said computed angles and associated with each said point to form said workpiece shading image data.

* * * * *

UNITED STATES PATENT AND TRADEMARK OFFICE
CERTIFICATE OF CORRECTION

PATENT NO. : 5,278,917
DATED : January 11, 1994
INVENTOR(S) : Eriko Tayaoka, et. al.

It is certified that error appears in the above-indentified patent and that said Letters Patent is hereby corrected as shown below:

Column 2, line 55, delete "an"; Column 2, line 62, "observe" should be -- observer --.

Signed and Sealed this

Seventeenth Day of May, 1994

Attest:

BRUCE LEHMAN

*Attesting Officer*     *Commissioner of Patents and Trademarks*